United States Patent
Nam et al.

(10) Patent No.: US 6,737,949 B2
(45) Date of Patent: May 18, 2004

(54) ELECTROMAGNETIC CLUTCH COIL ASSEMBLY AND MANUFACTURING METHOD THEREOF

(75) Inventors: Suk-chan Nam, Daejon (KR); Kap-yeol Lee, Belleville (CA)

(73) Assignees: Halla Climate Control Corporation, Daejon (KR); Halla Climate Control Incorporation, Belleville (CA)

(*) Notice: Subject to any disclaimer, the term of this patent is extended or adjusted under 35 U.S.C. 154(b) by 0 days.

(21) Appl. No.: 10/136,471

(22) Filed: May 2, 2002

(65) Prior Publication Data

US 2003/0011457 A1 Jan. 16, 2003

(30) Foreign Application Priority Data

May 10, 2001 (KR) ........................................ 2001-25567

(51) Int. Cl.[7] .............................................. H01F 27/30
(52) U.S. Cl. ...................................... 336/205; 29/602.1
(58) Field of Search ................................ 336/198, 199, 336/205–207, 209, 96; 29/602.1, 603.23, 603.24–603.26, 605, 606

(56) References Cited

U.S. PATENT DOCUMENTS 3,045,290 A    7/1962  Anderson et al.
4,239,077 A  * 12/1980  Dixon et al. ................. 156/272
4,422,377 A  * 12/1983  Jezbera ........................ 336/231
5,091,028 A  *  2/1992  Yamazaki et al. ............. 29/606
5,412,362 A  *  5/1995  Ikeuchi ........................ 335/213

FOREIGN PATENT DOCUMENTS

JP         56062309        5/1981
JP         57172710       10/1982
JP       2000173820        6/2000

* cited by examiner

Primary Examiner—Tuyen T. Nguyen
(74) Attorney, Agent, or Firm—Lowe Hauptman Gilman & Berner LLP

(57) ABSTRACT

A method of manufacturing an electromagnetic clutch coil assembly provided in a compressor of an air conditioner for an automobile is achieved by forming a coil winding by winding a coil coated with an adhesive, heating the coil winding in a state of being pressed in a direction in which the coil winding is stacked, hardening the coil winding by cooling the coil winding in the state of being pressed in a direction in which the coil winding is stacked, and assembling the coil winding, a bobbin, and a cover in a field core assembly, wherein the adhesive between two neighboring coil layers in a direction in which the coil winding is stacked moves to a nearby empty space. Thus, during the operation of the compressor, the lead wires connected to both ends of the coil winding can be prevented from being damaged or short-circuited due to the vibrations and high temperature.

3 Claims, 9 Drawing Sheets

ELECTROMAGNETIC CLUTCH COIL ASSEMBLY AND MANUFACTURING METHOD THEREOF

BACKGROUND OF THE INVENTION

1. Field of the Invention

The present invention relates to an electromagnetic clutch coil assembly provided at a compressor of an air conditioner for an automobile, and a manufacturing method thereof.

2. Description of the Related Art

In general, an air conditioning system for an automobile includes an air conditioner for cooling the inside of the automobile. The conventional circulation cycle of coolant in the air conditioning system of the automobile is as follows. The coolant in the state of a low temperature and low pressure enters in a vaporizer. When the coolant vaporizes at the vaporizer, heat outside the vaporizer is used so that the outside temperature is lowered. The coolant exhausting from the vaporizer is in the state of high temperature and low pressure. Then, the coolant is compressed by a compressor and enters in the condenser. The condenser condenses the coolant to make it in the state of high temperature and high pressure. The coolant turns to be in the state of low temperature and low pressure at an expansion valve just before entering in the vaporizer.

In the above air conditioner, the compressor is typically driven by the power of an engine of the automobile. A drive shaft of the compressor is connected to a pulley of a crank shaft of the engine by a belt and rotates thereby. An electromagnetic clutch is included in a compressor assembly so that the power can be selectively transferred to the compressor. That is, the electromagnetic clutch of the compressor can selectively transfer the power of the crank shaft to the compressor by connecting or disconnecting a disk detachably installed at a stopper plate by using a magnetic force of an electromagnet, to or from a pulley assembly.

Figure 1:
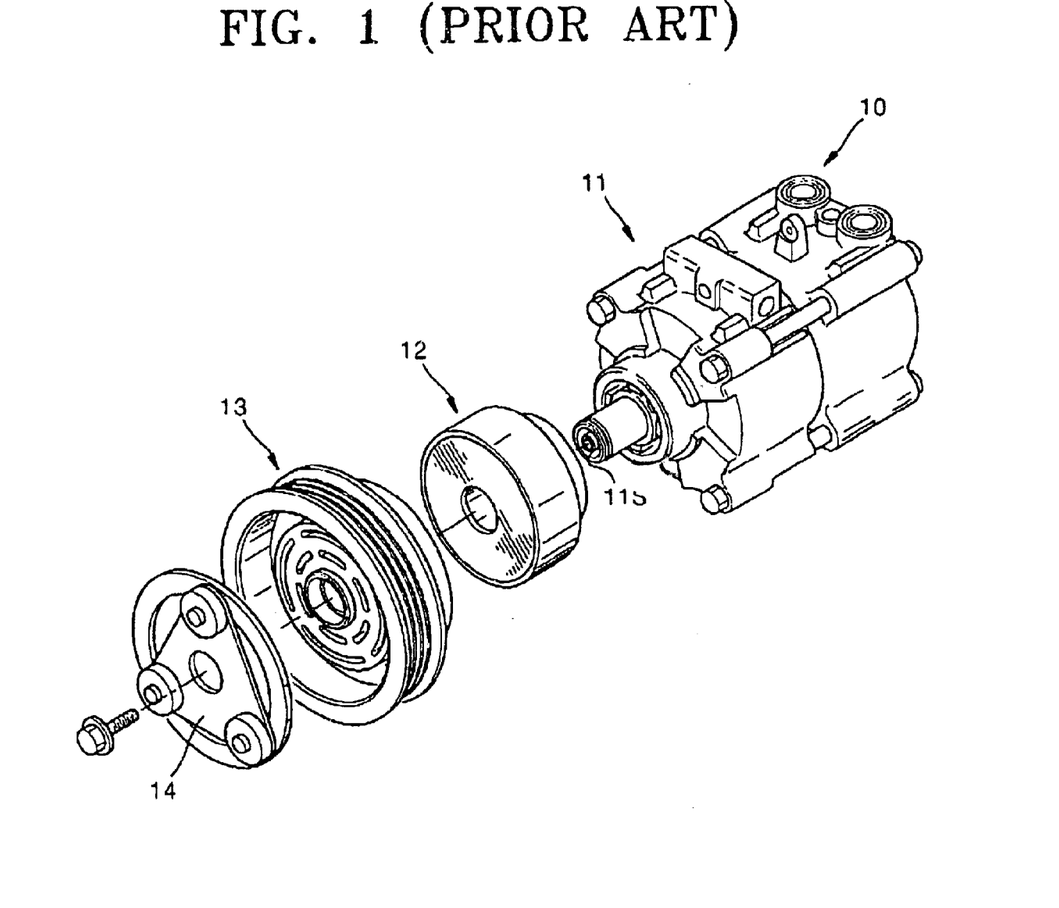
FIG. 1 is an exploded perspective view showing the typical compressor of an air conditioner for an automobile.

FIG. 1 shows the structure of a typical compressor of an air conditioner for an automobile. Referring to the drawing, an electromagnetic coil assembly 12, a pulley assembly 13, and a disk and hub assembly 14 are sequentially assembled to a main body 11 of the compressor. Since the pulley assembly 13 is connected by a belt to a pulley of a crank shaft of an engine of the automobile, an idling state is maintained. When an electric power is applied to the electromagnetic clutch coil assembly 12, a magnetic force is generated by the electromagnet. Thereby, a disk of the disk and hub assembly 14 contacts a frictional surface of the pulley assembly 13. When the disk rotates, a drive shaft 11S of the main body 11 of the compressor rotates.

Figure 2:
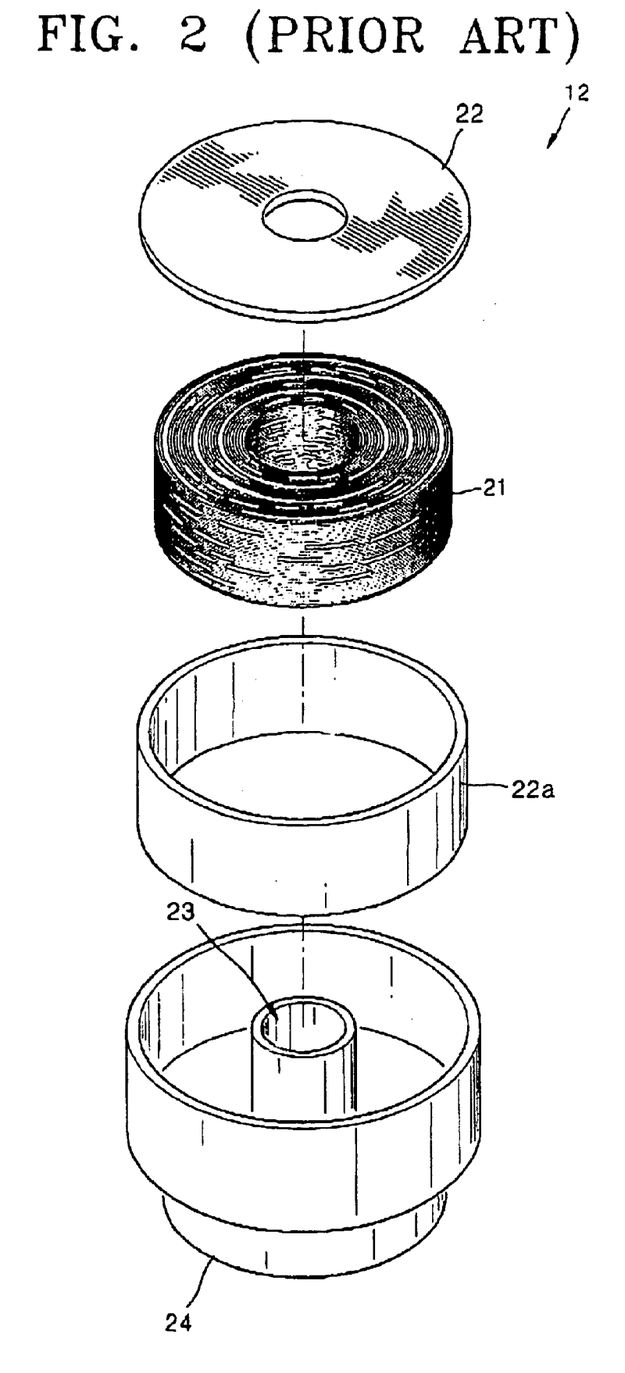
FIG. 2 is an exploded perspective view showing the electromagnetic clutch coil assembly of the compressor of FIG. 1.

FIG. 2 shows the structure of the electromagnetic clutch coil assembly 12 of the compressor 10 of FIG. 1. Referring to FIG. 2, a coil winding 21 is inserted in a bobbin 22a and the bobbin 22a together with the coil winding 21 is inserted in a field core assembly 24 where a central hollow portion 23 is formed. Accordingly, the coil winding 21 is insulated by the bobbin 22a from the inner surface of the field core assembly 24. The coil winding 21 inserted in the field core assembly 24 is closed by a cover 22 having a central aperture.

In a conventional method of manufacturing the electromagnetic clutch coil assembly, first, the coil winding 21 is formed by winding a coil coated with an adhesive. Next, the coil winding 21 is heated at a high temperature and hardened by cooling. Then, the coil winding 21, the bobbin 22a, and the cover 22 are assembled in the field core assembly 24.

In the above conventional manufacturing method of the electromagnetic clutch coil assembly, lead wires connected to both ends of the coil winding of the electromagnetic clutch are damaged or short-circuited due to vibrations and high temperature of the automobile during the operation of compressor.

SUMMARY OF THE INVENTION

To solve the above-described problems, it is an object of the present invention to provide an electromagnetic clutch coil assembly and a manufacturing method thereof which can prevent the lead wires connected to both ends of the coil winding of the electromagnetic clutch from being damaged or disconnected due to vibrations and high temperature of the automobile.

To achieve the above object, there is provided a method of manufacturing an electromagnetic clutch coil assembly provided in a compressor of an air conditioner for an automobile, the method comprising (a) forming a coil winding by winding a coil coated with an adhesive, (b) heating the coil winding in a state of being pressed in a direction in which the coil winding is stacked, (c) hardening the coil winding by cooling the coil winding in the state of being pressed in a direction in which the coil winding is stacked, and (d) assembling the coil winding, a bobbin, and a cover in a field core assembly, wherein the adhesive between two neighboring coil layers in a direction in which the coil winding is stacked moves to a nearby empty space.

It is preferred in the present invention that, in (b) and (C), me coil winding is pressed by an air compressor in the direction in which the coil winding is stacked.

It is preferred in the present invention that, in (a), the coil is compacted by being extended by a tensile force so that the height of the coil winding decreases.

To achieve the above object, there is provided an electromagnetic clutch coil assembly provided in a compressor of an air conditioner for an automobile, comprising a coil winding formed by winding a coil coated with an adhesive and heated and pressed in a direction in which the coil winding is stacked, so that an adhesive between two neighboring coil layers in the direction in which the coil winding is stacked moves to a nearby empty space; and a bobbin, a field core assembly, and a cover assembled together with the coil winding.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

First, in order to find basic problems in the above-described conventional technology and to form a fundamental understanding of the present invention, the difference in appearance between a coil winding having damaged lead wires connected to both ends thereof in a practical field and a normal coil winding that has not been applied in the field is found. The difference is that the total thickness (vertical height) of the coil winding having damaged lead wires is shorter than that of the normal coil windings. That is, it can be said that one of reasons for the damage of the lead wires is the total thickness of the coil winding is reduced as the coil winding is further compacted due to high temperature of the coil winding itself, high temperature from the engine, and vibrations of the automobile during operation of the compressor. When the total thickness of the coil winding decreases, a space for the coil winding to move in the field core assembly increases so that the amount of impact applied to the lead wires connected to both ends of the coil winding increases. The above phenomenon is proved in the following tests. Thus, to reduce the amount of compacting of the coil winding in the practical field as much as possible in advance in the step of manufacturing the coil winding is the fundamental of the present invention.

Figure 3:
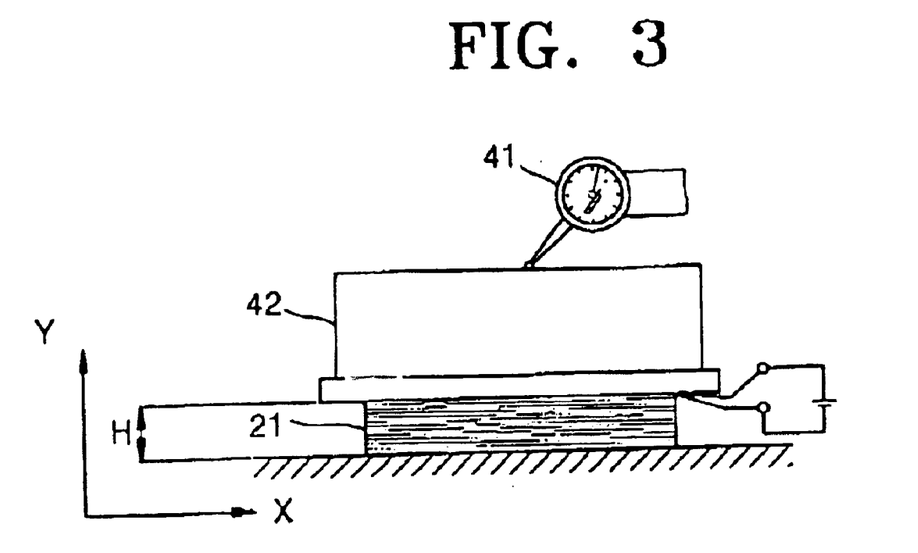
FIG. 3 is a view showing the environment of a pressure-temperature application test with respect to the coil winding of the electromagnetic clutch coil assembly of FIG. 2.

FIG. 3 shows the environment of a pressure-temperature application test with respect to the coil winding of the electromagnetic clutch coil assembly of FIG. 2. Referring to FIG. 3, DC of 20 V is applied to both ends of the coil winding 21 and a weight of 8 Kg is put on the coil winding 21. Also, the temperature of the coil winding 21 is measured by an infrared thermometer. The total thickness of the coil winding 21, that is, the amount (mm) of contraction of height (H) in a direction that the coil winding is stacked (direction Y), with respect to an increase of temperature is measured by a dial gauge 41. The results of measurement are shown in the following Table 1.

TABLE 1

| Time | Amount of contraction (mm) | Temperature (° C.) |
|---|---|---|
| 30 sec | 0 | 52 |
| 1 min | 0.01 | 65 |
| 1 min 30 sec | 0.01 | 88 |
| 2 min | 0 | 100 |
| 2 min 30 sec | −0.01 | 112 |
| 3 min | 0.08 | 120 |
| 3 min 30 sec | 0.23 | 130 |
| 4 min | 0.35 | 138 |
| 4 min 30 sec | 0.46 | 143 |
| 5 min | 0.54 | 148 |
| 5 min 30 sec | 0.59 | 150 |
| 6 min | 0.62 | 155 |
| 6 min 30 sec | 0.64 | 162 |
| 7 min | 0.65 | 158 |
| 7 min 30 sec | 0.65 | 165 |
| 8 min | 0.65 | 169 |

According to Table 1, it can be seen that the amount of contraction in the total thickness of the coil winding is proportional to the temperature. The above result proves that the conventional coil winding having a low degree of compacting can be contracted by the heat from the engine. However, it is necessary to determine what is being contacted inside of a coil winding and to apply the result to the present invention. For this purpose, the pressure-temperature application test of FIG. 3 is performed with respect to five conventional coil windings to measure the total thickness of the coil winding, that is, the height in a direction that the coil winding is staked (direction Y), and the outer diameter and the inner diameter of the coil winding. The results of the above test are shown in the following Table 2.

TABLE 2

| Sample | | Outer diameter (mm) | | | | Inner diameter (mm) | | | | Total thickness (mm) | | | |
|---|---|---|---|---|---|---|---|---|---|---|---|---|---|
| No. | | 1st | 2nd | 3rd | Ave. | 1st | 2nd | 3rd | Ave. | 1st | 2nd | 3rd | Ave. |
| 1. | Before test | 81.61 | 81.37 | 81.64 | 81.54 | 64.76 | 64.80 | 64.81 | 64.79 | 21.94 | 21.28 | 22.00 | 21.74 |
| | After test | 81.38 | 81.46 | 82.44 | 81.76 | 64.81 | 64.78 | 64.93 | 64.84 | 20.77 | 20.80 | 20.53 | 20.70 |
| 2. | Before test | 81.45 | 82.20 | 81.80 | 81.82 | 64.73 | 64.80 | 64.87 | 64.80 | 21.96 | 21.27 | 21.91 | 21.71 |
| | After test | 81.59 | 82.26 | 81.44 | 81.76 | 64.85 | 64.89 | 64.80 | 64.85 | 20.90 | 20.89 | 21.08 | 20.96 |
| 3. | Before test | 81.40 | 82.04 | 81.60 | 81.68 | 64.73 | 64.80 | 64.69 | 64.74 | 21.95 | 21.23 | 22.90 | 21.69 |
| | After test | 81.75 | 82.19 | 81.37 | 81.77 | 64.85 | 64.77 | 64.90 | 64.84 | 20.80 | 20.89 | 21.36 | 21.02 |

TABLE 2-continued

| Sample | Outer diameter (mm) | | | | Inner diameter (mm) | | | | Total thickness (mm) | | | |
|---|---|---|---|---|---|---|---|---|---|---|---|---|
| No. | 1st | 2nd | 3rd | Ave. | 1st | 2nd | 3rd | Ave. | 1st | 2nd | 3rd | Ave. |
| 4. Before test | 81.70 | 81.97 | 81.56 | 81.74 | 64.76 | 64.76 | 64.80 | 64.77 | 21.93 | 21.27 | 21.95 | 21.72 |
| After test | 82.01 | 81.35 | 81.17 | 81.51 | 64.68 | 64.98 | 64.27 | 64.64 | 21.01 | 20.80 | 21.47 | 21.09 |
| 5. Before test | 81.34 | 81.92 | 82.06 | 81.77 | 64.74 | 64.81 | 64.68 | 64.74 | 21.93 | 22.09 | 21.89 | 21.97 |
| After test | 81.25 | 81.18 | 82.10 | 81.51 | 64.38 | 64.35 | 64.56 | 64.43 | 20.99 | 20.81 | 21.06 | 20.95 |

In Table 2, to calculate a mean deviation between data before test and data after test, it can be seen that the outer and inner diameters are reduced by an average of 0.05 mm and the total thickness is reduced by an average of 0.82 mm. That is, according to Table 2, the amount of change in the inner and outer diameters of the coil winding is very minute, which can be seen as a measurement deviation. Thus, the coil winding itself does not contract and a filling material between coil and coil is determined to be a major reason for contraction.

Figure 4A:
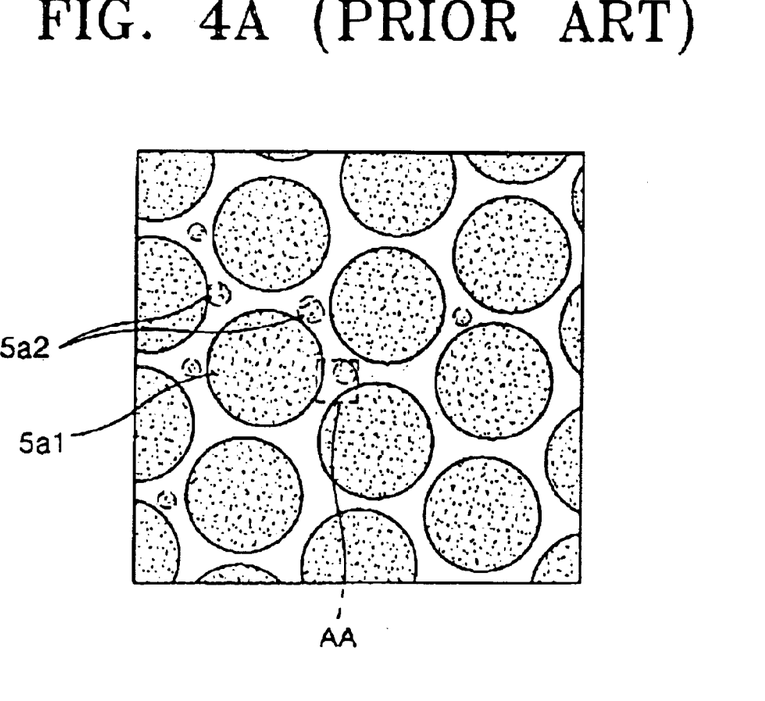
FIG. 4A is a 100× magnified view of the coil winding of the electromagnetic clutch coil assembly of FIG. 2.
Figure 4B:
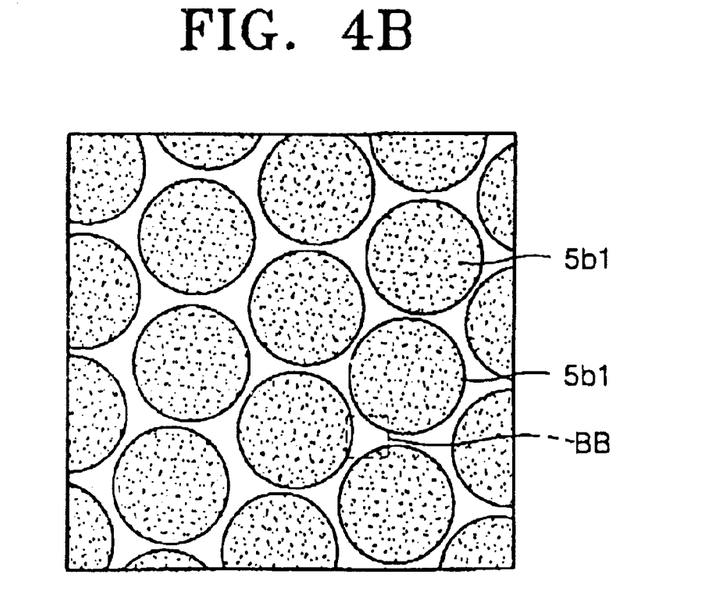
FIG. 4B is a 100× magnified view of the coil winding to which pressure is applied in the test of FIG. 3.

FIG. 4A is a 100× magnified view of the coil winding of the electromagnetic clutch coil assembly of FIG. 2. FIG. 4B is a 100× magnified view of the coil winding to which pressure is applied in the test of FIG. 3. Referring to FIG. 4A, it can be seen that pores 5a2 are present between a coil 5a1 and a coil 5a1 of the coil winding which is not pressed in the state of being heated according to the conventional manufacturing method. However, referring to FIG. 4B, it can be seen that pores are not present any more between the coil 5a1 and the coil 5a1 of the coil winding which is pressed in the state of being heated according to the present invention.

Figure 5A:
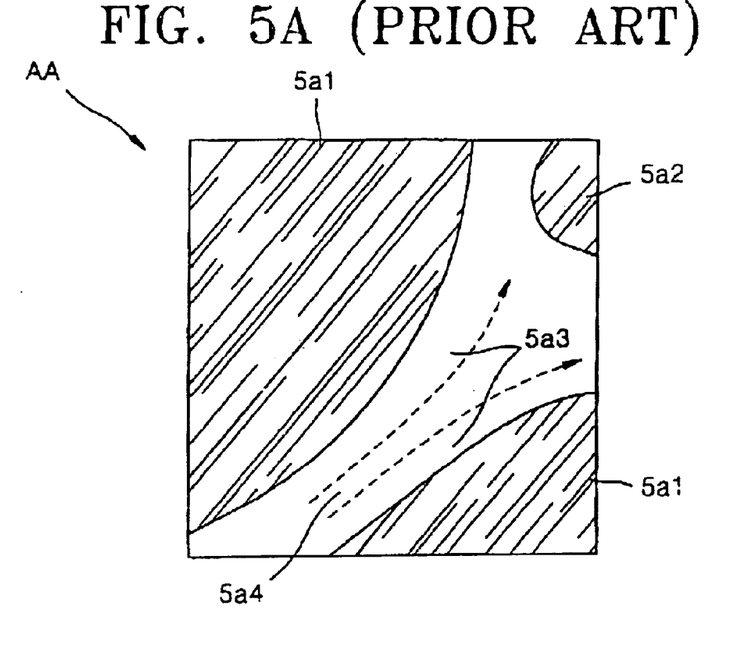
FIG. 5A is a 400× magnified view of a portion AA of FIG. 4A.
Figure 5B:
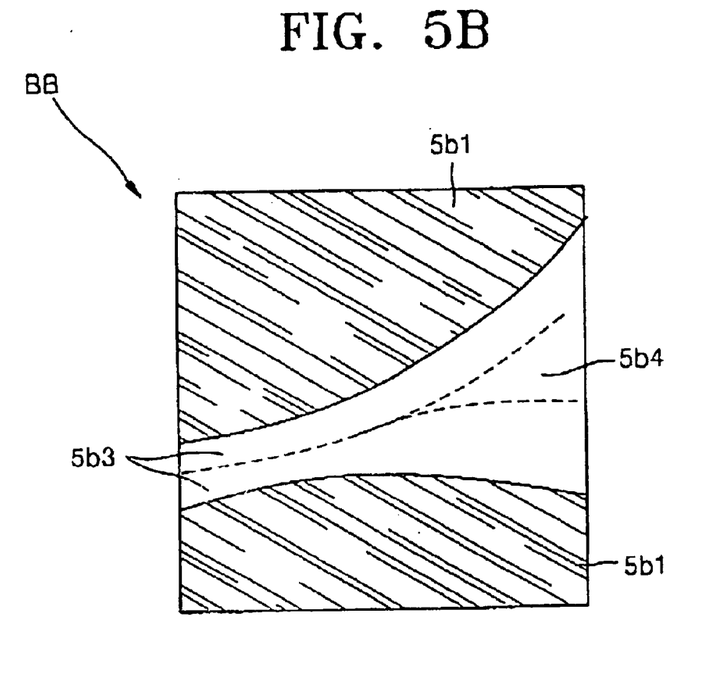
FIG. 5B is a 100× magnified view of a portion BB of FIG. 4B.
Figure 6A:
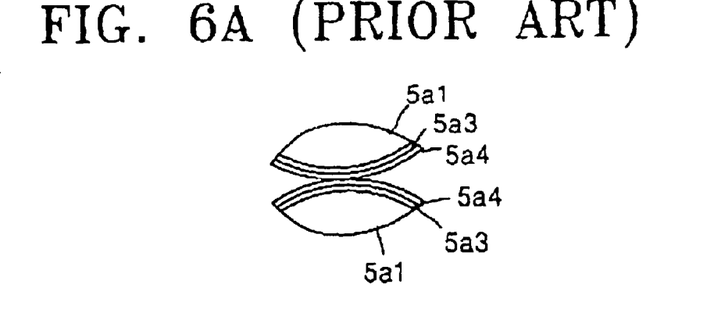
FIG. 6A is a conceptual view of FIG. 5A.
Figure 6B:
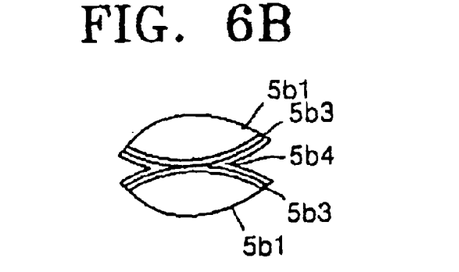
FIG. 6B is a conceptual view of FIG. 5B.

FIG. 5A is a 400× magnified view of a portion AA of FIG. 4A, and FIG. 5B is a 100× magnified view of a portion BB of FIG. 4B. FIG. 6A is a conceptual view of FIG. 5A, and FIG. 6B is a conceptual view of FIG. 5B.

Referring to FIGS. 5A through 6B, insulation layers 5a3 are present between two coils 5a1 of the coil winding which is not pressed in the state of being heated according to the conventional manufacturing method and an adhesive layer 5a4 is present between the insulation layers 5a3. However, insulation layers 5b3 are present between the two coils 5b1 of the coil winding which is pressed in the state of being heated according to the present invention and an adhesive layer 5b4 is hardly present between the insulation layers 5b3. That is, when the coil winding is pressed in the state of being heated in a direction in which the coil winding is stacked according to the present invention, the adhesive between the two neighboring coils in the direction in which the coil winding is stacked moves to a nearby empty space so that compacting is possible.

Figure 7A:
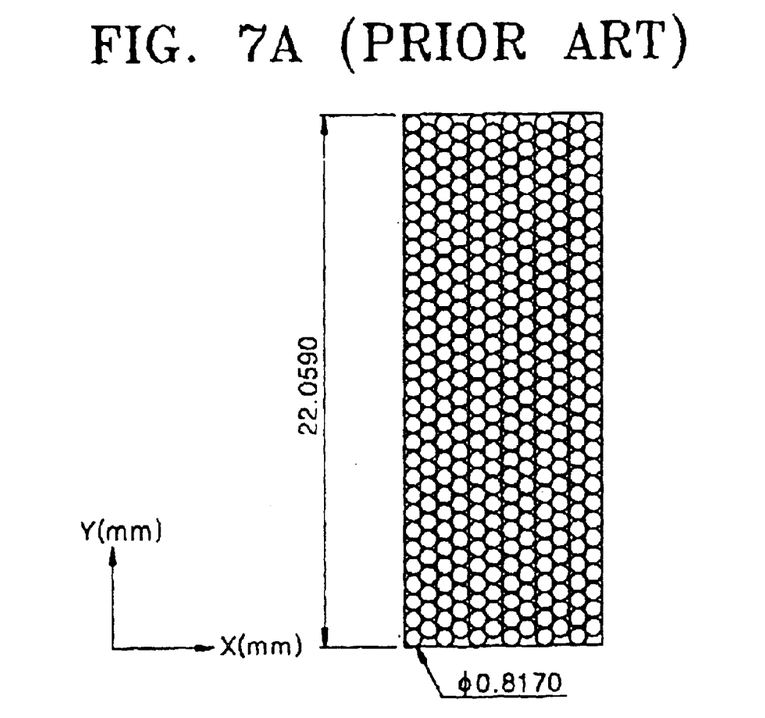
FIG. 7A is a sectional view of the coil winding of the electromagnetic clutch coil assembly of FIG. 2 according to the conventional manufacturing method.
Figure 7B:
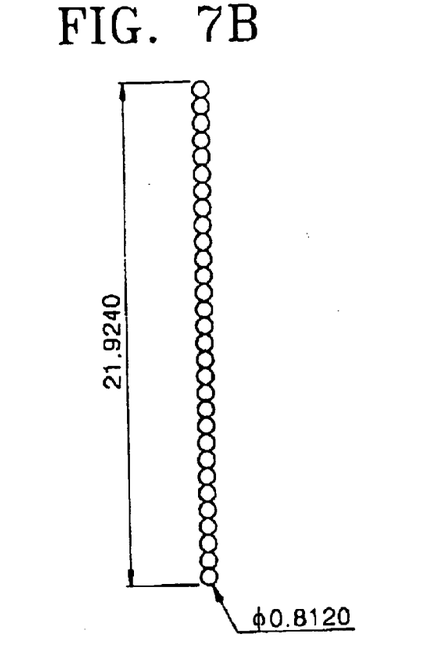
FIG. 7B is a sectional view of the coil winding by a first tension force higher than the conventional force.
Figure 7C:
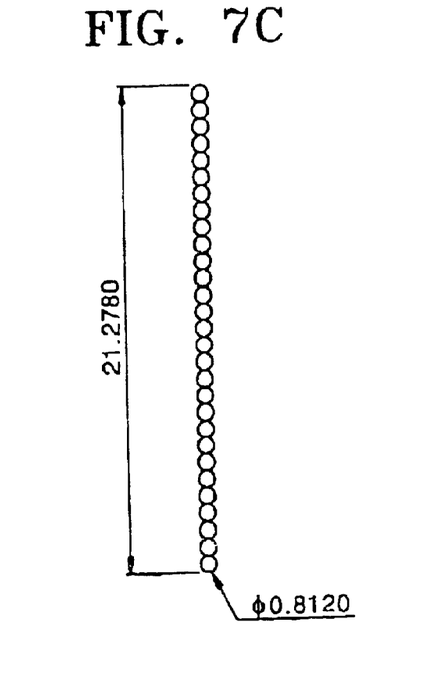
FIG. 7C is a sectional view of the coil winding in the state in which the application of pressure of FIG. 3 is performed to the coil winding of FIG. 7B.
Figure 7D:
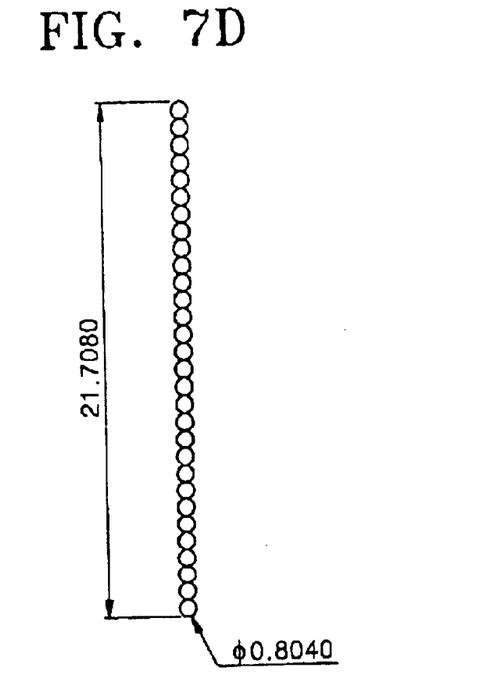
FIG. 7D is a sectional view of the coil winding by a second tension force higher than the tension force of FIG. 7B.
Figure 7E:
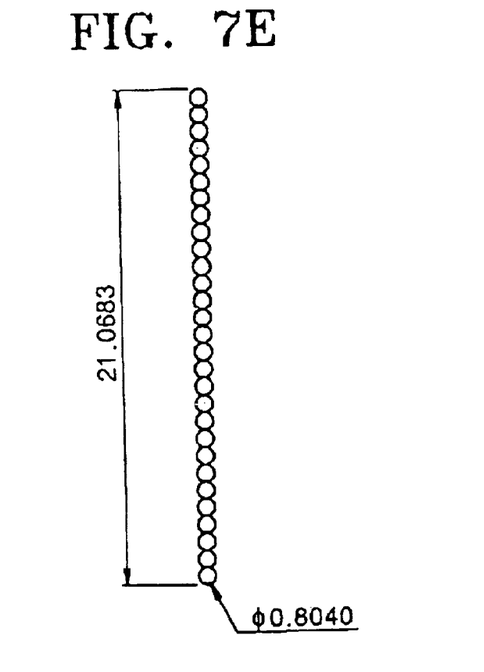
FIG. 7E is a sectional view of the coil winding in the state in which the application of pressure of FIG. 3 is performed to the coil winding of FIG. 7D.

FIG. 7A shows the coil winding of the electromagnetic clutch coil assembly of FIG. 2 according to the conventional manufacturing method. FIG. 7B shows the coil winding by a first tension force higher than the conventional force. FIG. 7C shows the coil winding in the state in which the application of pressure of FIG. 3 is performed to the coil winding of FIG. 7B. FIG. 7D shows the coil winding by a second tension force higher than the tension force of FIG. 7B. FIG. 7E shows the coil winding in the state in which the application of pressure of FIG. 3 is performed to the coil winding of FIG. 7D. In FIGS. 7A through 7E, reference character Y denotes the direction in which the coil winding is stacked.

Referring to FIGS. 7A through 7E, in the step of forming a coil winding, it is preferred that a coil is extended by a tensile force and compacted so that the height of the coil winding decreases.

Figure 8:
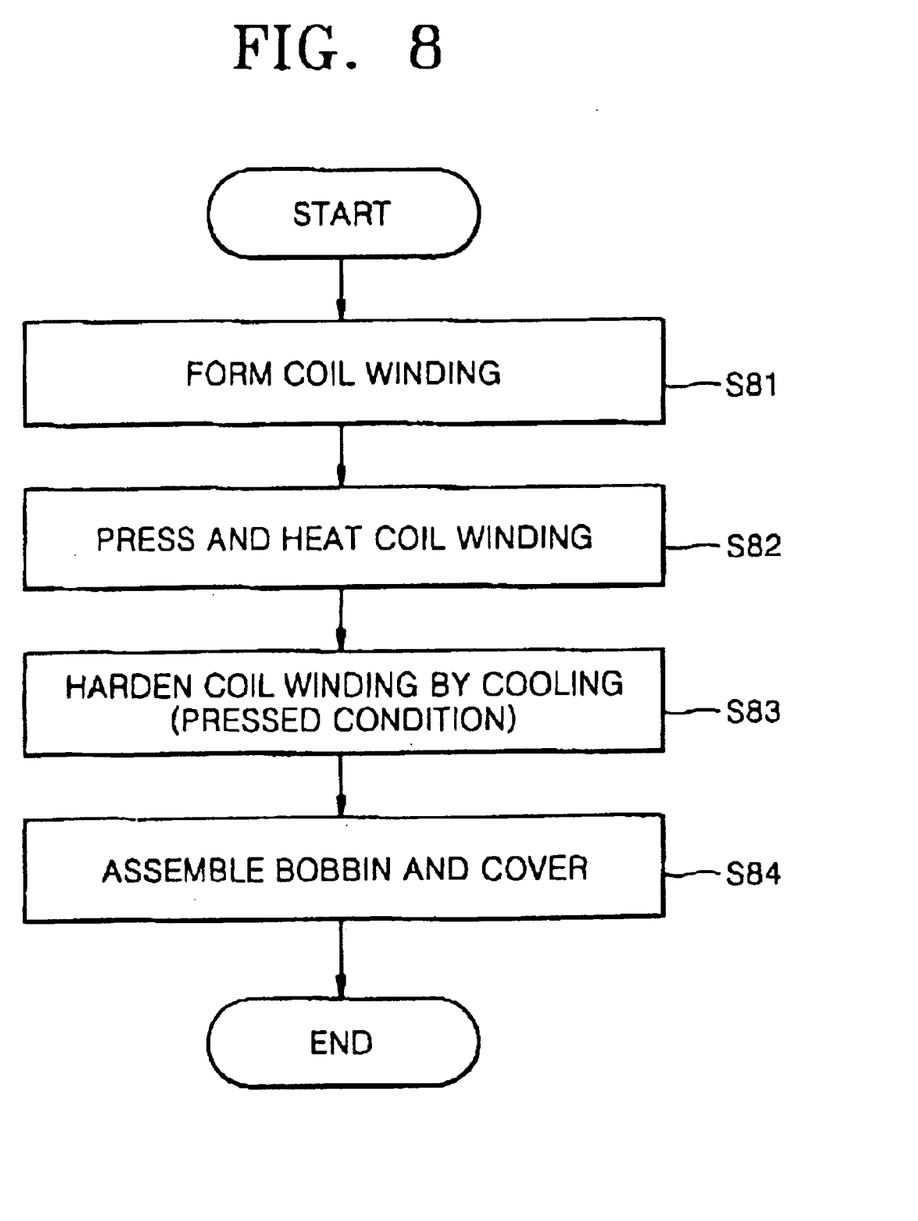
FIG. 8 is a flow chart for explaining a method of manufacturing the electromagnetic clutch coil assembly of FIG. 2 according to the present invention.

FIG. 8 shows a method of manufacturing the electromagnetic clutch coil assembly of FIG. 2 according to the present invention. Referring to FIGS. 2 and 8, a coil winding 21 is formed by winding a coil coated with an adhesive (S81). Here, the coil is extended by a tensile force and compacted so that the height of the coil winding decreases. Next, the coil winding 21 is pressed by an air presser in the coil staking direction and heated at a high temperature (S82). The coil winding 21 in the state of being pressed by an air presser in the coil staking direction is cooled and hardened (S83). Then, the coil winding 21, the bobbin 22a, and the cover 22 in the field core assembly 24 (S84).

In the steps of S82 and S83, the coil winding 21 can be pressed by a hydraulic pressing unit or an electric actuator in addition to the air presser. Also, in the step of S82, the coil winding 21 can be directly heated by applying a voltage to both ends of the winding 21, as shown in FIG. 3, or indirectly heated by a high temperature around the coil winding 21.

As described above, according to the electromagnetic clutch coil assembly according to the present invention and a manufacturing method thereof, the adhesive between two coil layers adjacent in the direction in which the coil winding is stacked moves to a neighboring empty space by performing heating and hardening steps. Accordingly, a degree of integration of the coil winding is improved so that the distance the coil winding moves with respect to vibrations and high temperature decreases. That is, during the operation of the compressor, the lead wires connected to both ends of the coil winding can be prevented from being damaged or short-circuited due to the vibrations and high temperature.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method of manufacturing an electromagnetic clutch coil assembly provided in a compressor of an air conditioner for an automobile, the method comprising:

(a) forming a coil winding comprising neighboring coil layers by winding a coil coated with an adhesive;

(b) heating the coil winding in a state of being pressed in the direction in which the coil winding is stacked;

(c) hardening the coil winding by cooling the coil winding in the state of being pressed in the direction in which the coil winding is stacked; and (d) assembling the coil winding, a bobbin, and a cover in a field core assembly, wherein the adhesive, that is located between two said neighboring coil layers in the direction in which the coil winding is stacked, moves to nearby empty spaces.

2. The method as claimed in claim 1, wherein, in (b) and (c), the coil winding is pressed by an air compressor in the direction in which the coil winding is stacked.

3. The method of claim 1, comprising the further step of maintaining an insulation layer between the two neighboring coil layers.

* * * * *